Jan. 17, 1933.  E. W. WEBB  1,894,386
SPRING DAMPING TRUCK
Filed Feb. 13, 1932   2 Sheets-Sheet 1

INVENTOR.
EDWIN W. WEBB.
BY HIS ATTORNEYS
Williamson & Williamson

Jan. 17, 1933.  E. W. WEBB  1,894,386
SPRING DAMPING TRUCK
Filed Feb. 13, 1932  2 Sheets-Sheet 2
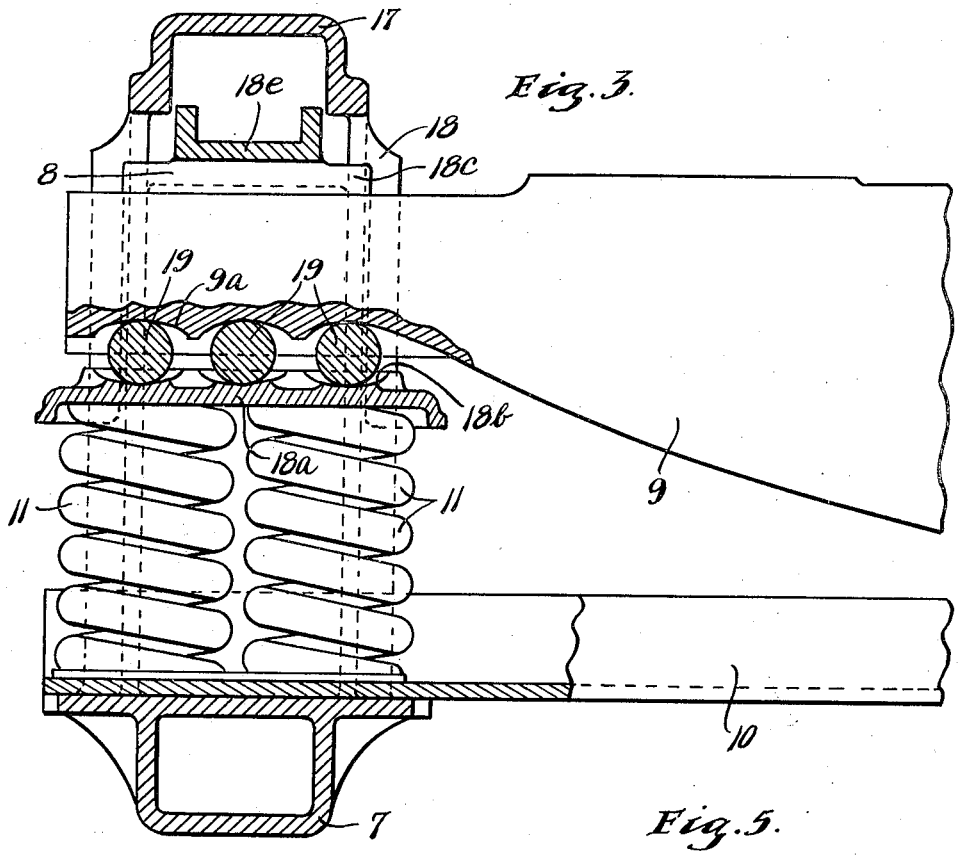
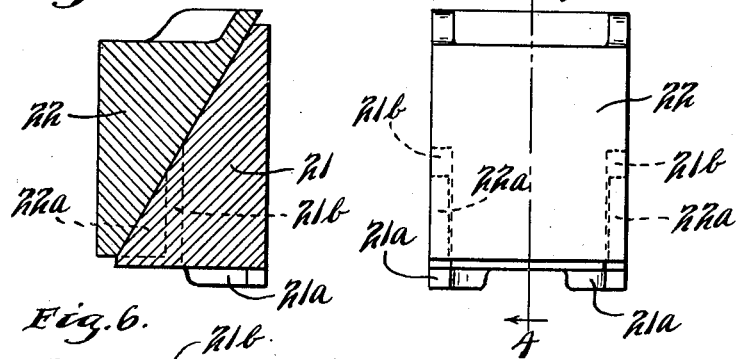
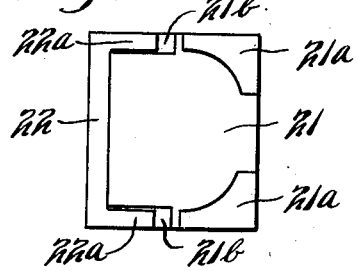
INVENTOR.
EDWIN W. WEBB.
BY HIS ATTORNEYS.
Williamson & Williamson Patented Jan. 17, 1933

1,894,386

UNITED STATES PATENT OFFICE

EDWIN W. WEBB, OF CHICAGO, ILLINOIS, ASSIGNOR TO STANDARD CAR TRUCK COMPANY, OF CHICAGO, ILLINOIS, A CORPORATION OF NEW JERSEY

SPRING DAMPING TRUCK

REISSUED

Application filed February 13, 1932. Serial No. 592,722.

This invention relates to spring damping means for car trucks.

This application is one of a group of three applications directed to spring damping means for car trucks. My application Serial Number 592,720, filed simultaneously herewith and entitled "Lateral motion spring damping car truck" is one of this group of three applications, while my application for Patent Serial Number 592,721, also filed simultaneously with this application and entitled "Spring damping car truck" is a second application of this group. The present invention embodies the inventions disclosed in the above identified applications in their broader aspects, but differs considerably from said above identified inventions in its more specific aspects.

Generally stated, it is the object of the invention to provide a novel and improved spring damping car truck having certain advantages in its construction over those disclosed in my prior above identified applications for patent.

To this end, generally stated, the invention consists in the novel parts and novel combinations of parts hereinafter defined in the claims and described in the following specification, made in connection with the accompanying drawings wherein like reference characters refer to the same or similar parts throughout the various views and in which;

Fig. 3 is a vertical sectional view taken substantially on the line 3—3 of Fig. 1, as indicated by the arrows, the truck bolster being shown chiefly in side elevation;

Fig. 4 is a vertical longitudinal section taken substantially on the line 4—4 of Fig. 5 through a pair of co-acting wedges;

Fig. 5 is a view in end elevation of the same wedges; and

Fig. 6 is a bottom view of the co-acting wedges.

Figure 1:
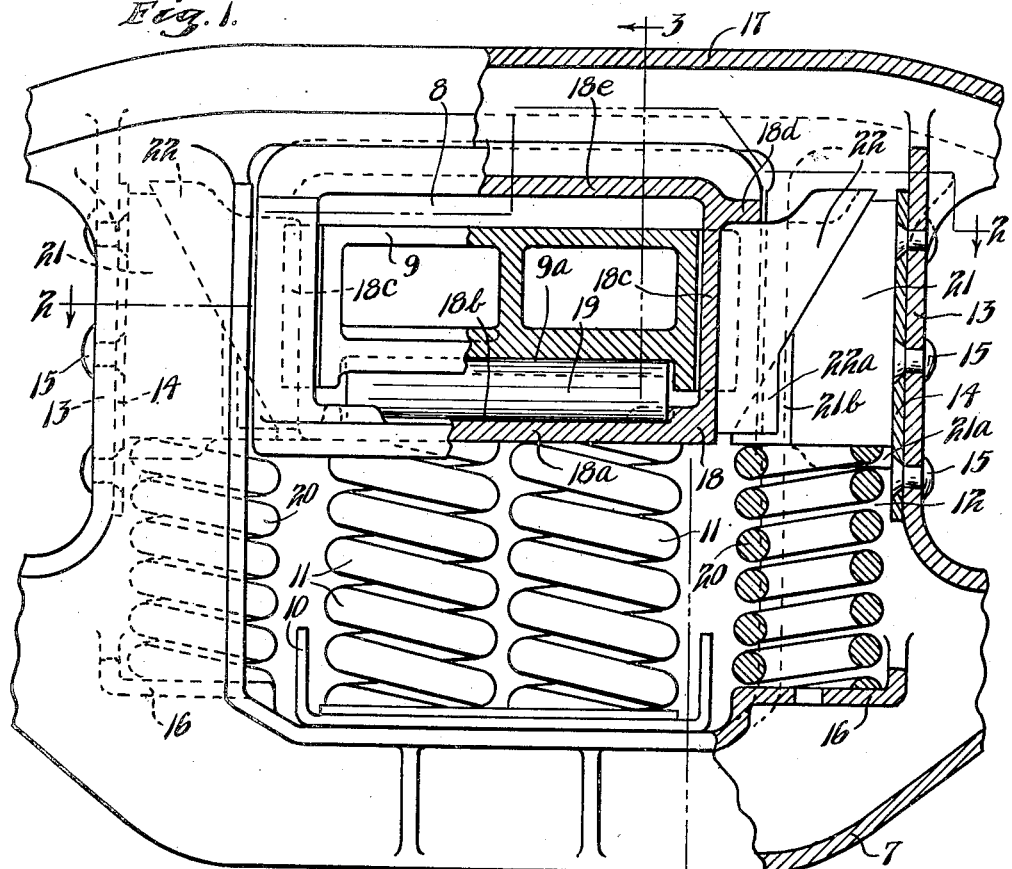
Fig. 1 is a view partly in side elevation and partly in vertical longitudinal section taken through portions of a car truck wherein the present invention is embodied.

Referring to the drawings, portions of a car truck are illustrated, which include a side frame 7 having a bolster opening 8 within which one end of a car truck bolster 9 is disposed. One end of a spring plank 10, disposed within the bolster opening 8 rests on the side frame 7 and a group of coiled bolster springs 11 are supported at their lower ends within the bolster opening on this end of the spring plank 10. The side frame 7 has side webs 12 laterally spaced from each other and interconnected by vertical cross webs 13 and the side webs 12, together with the vertical webs 13, form the bolster columns of the side frame. The inner surface of each cross web 13 is lined by a wear plate 14 secured to web 13 as by means of rivets 15. At the sides of the bolster opening 8 and adjacent the bottom of the same, short horizontal webs 16 are provided which interconnect the side webs 12 and form spring seats. The side frame 7 forms an arch bar 17 of channel-shape in vertical cross section, which traverses the upper portion of the bolster opening 8.

Figure 2:
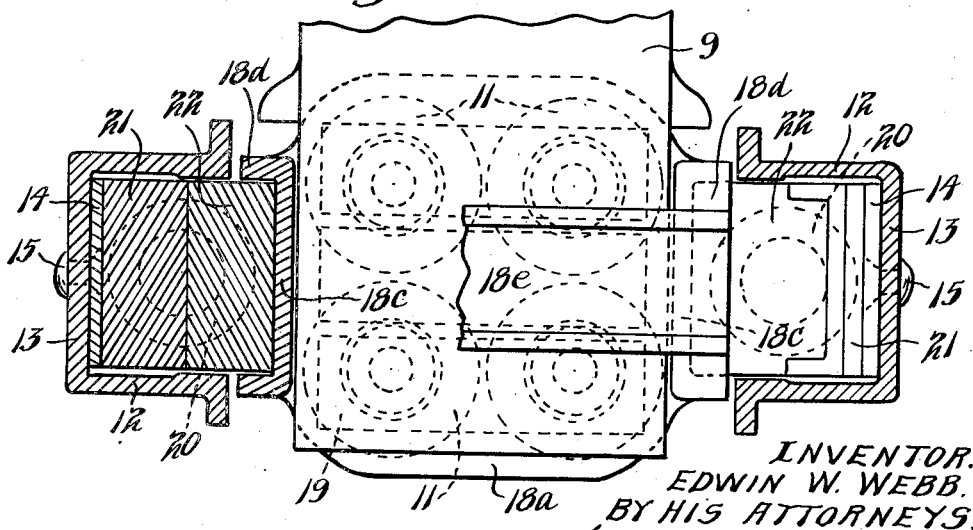
Fig. 2 is a horizontal sectional view taken substantially on the line 2—2 of Fig. 1, as indicated by the arrows.

A combination roller seat and chafing member 18 has a bottom 18a which rests upon the upper ends of the bolster springs 11. Laterally spaced roller contours 18b are formed on the upper surface of bottom 18a and supported within these contours are lateral motion rollers 19 which fit within laterally spaced roller contours 9a formed on the bottom surface of the end of bolster 9. The end of the bolster 9 is accordingly supported for lateral motion transversely of the truck and relative to the side frame 7 by the rollers 19 resting on the combination seat and chafing member 18, which is, in turn, supported by the bolster springs 11. The chafing member 18 has vertical sides 18c of channel-shape in horizontal cross section, as best shown in Fig. 2, and these channels are closed at their upper ends by means of cross webs 18d. The upper ends of the sides 18c are interconnected by a top 18e which traverses the end of the bolster 9 and is preferably of channel-shape in vertical cross section.

Resting on the horizontal webs forming the spring seats 16 are springs 20 which project upwardly to points about level with the normal position of the lower surface of the bottom 18a of chafing member 18. A pair of cooperating wedges 21 and 22 respectively are interposed between each side 18c of the chafing member and wear plate 14 facing the same and these wedges rest on and are supported by one of the springs 20. The wedges 21 have horizontal bottom surfaces against which the upper ends of the springs 20 bear and arcuate lugs 21a project downwardly from the bottom surfaces of these wedges 21 to partly encompass the upper ends of the springs 20. Wedges 21 may be designated outer wedges in contra-distinction to the wedges 22 which may be designated inner wedges. The outer wedges 21 have diagonally inclined inner surfaces which project from adjacent the bottoms of the wedges upwardly and outwardly toward the outer surfaces of the wedges 21, while the inner wedges 22 have outer inclined surfaces which engage the inclined surfaces of the outer wedges 21. The inner wedges 22 are recessed downwardly from their upper surfaces adjacent their inner edges and the webs 18d of the chafing member 18 bear against the recessed surfaces of the inner wedges 22. It will be seen that the inner portions of the inner wedges 22 are received within the channels formed by the sides 18c of the chafing member 18 and, accordingly, lateral movement of the inner wedges 22 is impossible. The inner wedges 22 have downwardly projecting triangular flanges 22a which are received within triangular-shaped recesses 21b formed in the sides of the outer wedges 21 and thus lateral movement of the outer wedges 21 relative to the inner wedges 22 is impossible. Although the wedges 21 and 22 are illustrated in the drawings as being of solid formation, these wedges may be cored to lighten the same when they are cast if desired.

Although in the drawings, but one end of the truck bolster 9 is illustrated and only one side frame structure is shown for supporting this end of the bolster, it will be understood that the opposite end of the bolster 9 from the end shown in the drawings, will be supported by a side frame structure which is a duplicate of the structure illustrated and described.

When the car truck is in service, as the wheels of the truck run over high spots on the rails, the bolster springs 11 will be compressed thereby causing the end of the bolster 9 supported by the side frame 7, to lower somewhat relative to the side frame and thereby move chafing member 18 downwardly somewhat relative to the bolster columns formed by the side webs 12 and vertical cross webs 13. As the cross webs 18d of the chafing member 18 rest on the inner wedges 22, wedges 22 and 21 will tend to move with the chafing member 18. Springs 20 will resist downward movement of wedges 21 relative to the side frame 7 and as a result, inner wedges 22 will tend to slide on outer wedges 21 to urge the wedges 22 into tighter engagement with the sides 18c of chafing member 18 and to urge wedges 21 into tighter engagement with wear plates 14. The frictional engagement between the outer surfaces of the wedges 21 and the wear plates 14 will offer resistance to the downward movement of the chafing member 18 and the end of bolster 9 relative to the side frame 7 and thus the compressive action of the bolster springs 11 will be damped. The added resistance offered by the wedges 21 and 22 to the compressive movement of the springs 11 increases tremendously as the forces tending to compress the springs 11 are increased. In other words, as the springs 11 are increasingly compressed, the added resistance offered to the compressive movement of the springs will be much more than directly proportional to the increase in the forces tending to compress the springs. The angle formed by the inclined surfaces of the wedges 21 and 22 with the vertical is such as to furnish maximum frictional resistance to sliding movement of wedges 21 and 22 relative to wear plates 14 and vertical cross webs 13 without causing sticking of the parts.

At all times the truck bolster 9 will have freedom for lateral motion transversely of the truck and relative to the side frame 7. The lateral motion rollers supported on the combination roller seat and chafing members 18 and, in turn, supporting the ends of the truck bolster 9 make this lateral motion of the truck bolster possible.

It will be apparent that if it is desired to eliminate the lateral motion feature of the present truck, this can easily be done by modifying the construction slightly. The words "truck bolster structure", as used in the claims, are to be construed broadly enough to include any suitable bolster, such as an ordinary bolster not equipped with the combination roller seat and chafing member 18, and rollers 19, as well as a bolster construction including such parts as bolster 9, combination roller seat and chafing members 18 and rollers 19.

It will, of course, be understood that various changes may be made in the form details arrangement and proportions of the various parts without departing from the scope of the present invention.

What is claimed is:—

1. In a car truck, side frames having bolster openings, a bolster structure having ends disposed within said bolster openings, bolster springs supporting the ends of said bolster structure from said side frames, pairs of oppositely disposed wedges interposed between the sides of said bolster structure and portions of said side frames, each end of said bolster structure resting on one wedge of each pair and springs interposed between the other wedges of each pair and portions of said side frames, said last mentioned springs urging said wedges into tighter wedging relation as said bolster springs are increasingly compressed.

2. In a car truck, side frames having bolster openings, a truck bolster structure having ends disposed within said openings, bolster springs supporting the ends of said bolstered structure from said side frames, inner and outer oppositely facing and contacting wedges interposed between the sides of the ends of said bolster structure and portions of said side frame, said bolster structure resting on said inner wedges and vertically disposed springs reacting between said outer wedges and other portions of said side frames, said last mentioned springs urging said wedges into tighter wedging relation as said bolster springs are increasingly compressed.

3. In a car truck, side frames having bolster openings, a truck bolster structure having ends disposed within said openings, bolster springs supporting the ends of said bolster structure from said side frames, said side frames having surfaces disposed in spaced parallel relation from the sides of said bolster structure, inner and outer oppositely facing and contacting wedges interposed between the sides of said bolster structure and said facing surfaces of said side frames, the ends of said bolster structure resting on said inner wedges and vertically disposed springs interposed between said outer wedges and portions of said side frames below the same.

4. In a car truck, side frames having bolster openings, a truck bolster structure having ends disposed within said openings, bolster springs supporting the ends of said bolster structure from said side frames, said side frames having surfaces spaced from the sides of the ends of said bolster structure, inner and outer oppositely facing and contacting wedges interposed between the sides of said bolster structure and said spaced surfaces, said side frames having spring supports below said wedges and springs resting on said spring supports and bearing at their upper ends against said outer wedges.

5. In a car truck, side frames having bolster openings, spring supports at the sides of said bolster openings adjacent the lower ends thereof, and vertical cross webs spaced from said bolster openings adjacent the upper ends thereof, a truck bolster structure having ends disposed within said bolster openings, bolster springs supporting the ends of said bolster structure from said side frames, inner and outer oppositely facing and contacting wedges interposed between the sides of the ends of said bolster structure and said vertical cross webs, said bolster structure resting on said inner wedges and springs resting at their lower ends of said spring supports and supporting said outer wedges.

6. In a car truck, side frames having bolster openings, a truck bolster having ends disposed within said openings, bolster springs supported by said side frames, members supported by said springs, lateral motion devices interposed between said members and the ends of said bolsters, inner and outer wedges having diagonal facing and contacting surfaces and interposed between the sides of said members and portions of said side frames, said members resting on said inner wedges and springs interposed between said outer wedges and portions of said side frames and urging said wedging members into tighter wedging relation as said bolster springs are increasingly compressed.

In testimony whereof I affix my signature.
EDWIN W. WEBB.